United States Patent
Schroeder et al.

(10) Patent No.: US 8,101,036 B2
(45) Date of Patent: Jan. 24, 2012

(54) CORROSION INHIBITORS IN ADHESIVE BONDING OF VEHICLE BODY STRUCTURES

(75) Inventors: Jessica A. Schroeder, Sterling Heights, MI (US); Anil K. Sachdev, Rochester Hills, MI (US); Mark W. Verbrugge, Troy, MI (US); Thomas C. Pederson, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 873 days.

(21) Appl. No.: 11/760,282

(22) Filed: Jun. 8, 2007

(65) Prior Publication Data
US 2008/0305362 A1    Dec. 11, 2008

(51) Int. Cl.
*B29C 65/00* (2006.01)
*B05D 3/02* (2006.01)
*B32B 5/16* (2006.01)

(52) U.S. Cl. .............. 156/73.1; 427/372.2; 428/402.2

(58) Field of Classification Search .......... 156/73.1; 427/372.2; 428/402.2
See application file for complete search history.

(56) References Cited

U.S. PATENT DOCUMENTS

| | | | |
|---|---|---|---|
| 3,874,883 A * | 4/1975 | Robitaille et al. | 106/14.21 |
| 4,855,209 A * | 8/1989 | Martin et al. | 430/109.3 |
| 5,022,545 A * | 6/1991 | Carson | 215/230 |
| 6,075,072 A * | 6/2000 | Guilbert et al. | 523/200 |
| 6,506,494 B2 * | 1/2003 | Brandys et al. | 428/402.2 |
| 2002/0081431 A1 * | 6/2002 | Schmdt | 428/402 |
| 2004/0112531 A1 * | 6/2004 | Bogert et al. | 156/307.3 |
| 2006/0144513 A1 * | 7/2006 | Bogert et al. | 156/307.3 |
| 2008/0178986 A1 * | 7/2008 | Siavoshani et al. | 156/73.1 |

FOREIGN PATENT DOCUMENTS

JP    2005-119577    * 5/2005

* cited by examiner

*Primary Examiner* — Kevin R. Kruer
(74) *Attorney, Agent, or Firm* — Reising Ethington P.C.

(57) ABSTRACT

In an illustrative embodiment, two panels of different materials may be bonded with a structural adhesive composition comprising microcapsules containing corrosion inhibiting materials for protecting the panels from corrosion. For example, a steel vehicle door outer panel may be bonded to an aluminum alloy or magnesium alloy inner panel using an epoxy adhesive. Dispersed within the uncured adhesive are an abundance of microcapsules filled with a fluid or mobile material for reacting with the iron and/or aluminum or magnesium to inhibit corrosion arising from the facing surfaces of the mixed metal panels. The protective material is released from the microcapsules for diffusion through the cured or uncured interfacial adhesive to react with one or both panel surfaces and form a protective coating on the surfaces.

10 Claims, 1 Drawing Sheet

CORROSION INHIBITORS IN ADHESIVE BONDING OF VEHICLE BODY STRUCTURES

TECHNICAL FIELD

This disclosure pertains to the joining of automotive vehicle components formed of dissimilar materials. More specifically this disclosure pertains to adhesive bonding of vehicle body parts, so as to minimize corrosion between the different metals or metal and composite materials, especially where the parts are exposed to an atmospheric moisture and salt containing environment.

BACKGROUND OF THE INVENTION

The building of automotive vehicle bodies usually involves the joining of complementary panels or the attachment of a panel to a frame structure. Vehicle doors and other closure members are often made of inner and outer panels. The panels are usually made of like materials, for example stamped steel sheet workpieces or stamped aluminum sheets, and joined by welding, hemming, mechanical fasteners, or adhesive bonding. Also, in the construction of some vehicle bodies, panels are made of polymeric composite moldings and adhesively bonded.

Structural adhesives are known for joining panels of like metal alloys and panels molded of fiber reinforced sheet molding compound for automotive applications. For example, commercial epoxy resins are suitable for this purpose. Urethane resins are also used in structural adhesive bonding applications. Adhesives for structural applications are dispensed in either one or two parts, where, in a two-part formulation; one of the parts contains the catalyst that hardens the adhesive. In a one part formulation, the catalytic curing agent is contained in the adhesive resin formulation. The adhesive is formulated as a mobile viscous material that can be withdrawn from a reservoir, separate streams mixed if a two-part adhesive is employed, and extruded as a bead or layer onto a surface using, for example, a programmed robotic applicator. The adhesive is applied to the bonding surface of at least one of like-material workpieces and the intended bonding surfaces of the workpieces are pressed together. The assembly is then typically treated (usually by heating) to activate the catalyzed polymerization reactions by which the adhesive is hardened or cured in a strong adherent bond between surfaces of the panels or other part combinations.

Now there is interest in attaching body members of different materials in order to reduce the weight of the full range of automotive vehicles used worldwide. For example, inner and outer door panels, lift gate panels, hoods and deck lids can be made of any combination of steel panels, aluminum panels, magnesium panels, carbon composite panels, or SMC panels to satisfy structural, weight, and appearance requirements. Similar uses of mixed materials may be employed to create structural subsystems or body frames involving panels and structural members of various shapes including castings and extrusions. But the use of such combinations of mixed materials presents issues of how the body members can be efficiently and effectively attached and how corrosion due to galvanic action between closely spaced different materials can be minimized.

SUMMARY OF THE INVENTION

In an embodiment of the invention sheet metal workpieces formed of dissimilar metal alloys are adhesively bonded in structural applications. For example, a steel door outer panel and an aluminum alloy door inner panel are bonded at facing surfaces to form a vehicle door structure for containing a window and other functional vehicle door components. The joining is accomplished using an adhesive composition comprising microcapsules containing a releasable material for reacting with and inhibiting corrosion on one or more facing surfaces of the bonded panels or other parts.

In some embodiments of the invention the adhesive composition may also comprise uniformly sized spacer beads for maintaining an interfacial gap between the facing parts and preventing adhesive from being squeezed from between the bonding surfaces before the adhesive is activated and cured. The spacer beads may, for example, be 0.762 mm (0.030 inch) or 0.508 mm (0.020 in.) or 0.254 mm (0.010 in.) in diameter, common bond thicknesses, which then provide an adhesive bond layer for a bonded sheet assembly. The actual bond thickness desired is a function of the adhesive and substrate(s) being used in the assembly. The adhesive is cured to form a bond between the metal workpieces.

The selection of the corrosion resistant material is based on the metal alloys selected for the mixed metal workpieces. Of course, various combinations of metal alloy pieces may be selected for adhesive bonding. In many embodiments of the invention, the selection of the corrosion inhibiting material will depend on the difference in potential between the materials giving rise to the galvanic coupling as well as the surface-adsorption characteristics of the inhibitor on the anodic and cathodic sites. In general, while aluminum alloys may not require corrosion inhibition when adhesively bonded to magnesium alloys or steels, magnesium alloys normally do require protection when bonded to steel. Aluminum alloys are often used as transition layers between magnesium and steel components so as to mitigate corrosion issues. Also, corrosion inhibitors are often used for aluminum and steel (even when not coupled to another material) if the material is expected to experience a corrosive environment (e.g., a warm, moist, and/or saline environment). Because aluminum joints can entrap moisture for prolonged durations, corrosive environments are often found, especially in structural members in or near the engine compartment, wherein higher temperatures can result.

In accordance with this invention the corrosion inhibiting material is contained within a suitable encapsulating material and mixed into the adhesive. The capsules are of a size (usually smaller than that of the spacer beads) that they may be dispersed within the mobile adhesive material and distributed in an interface between parts to be joined. Thus, the capsules will have diameters measurable in micrometers, and are often referred to in this specification as microcapsules.

The microcapsules may have polymeric or gelatin shells and cores of corrosion inhibiting material. The corrosion inhibiting material may be in the form of a solution or a mobile dispersion so that after the adhesive has been applied to a structural metal workpiece the corrosion inhibitor may be released from the microcapsules and migrate to the surface to be protected from galvanic corrosion. For example, the microcapsules may be broken at a time when the workpieces are pressed together for bonding (e.g., against the spacer beads) and before the adhesive is cured, or in the nozzle during dispensing, or the encapsulating material may be formulated to more slowly release the corrosion inhibiting material after the adhesive bonding process is completed and during the life of the bonded assembly.

In various embodiments, suitable chromate compositions may be used in protecting aluminum alloy or magnesium alloy parts. Chromates often offer anodic corrosion protection (i.e., where the potential electrochemical corrosive attack at the metal surface is an anodic reaction). Zinc sulfate is a common cathodic corrosion inhibitor for surfaces of these metals. Phosphates, silicates, nitrates, fluorides, benzoates, and various soluble oils are also useful inhibitors. Where an aluminum alloy contains copper, sodium mercaptobenzothiazole may be a useful inhibitor. Sodium carboxylate is often a suitable inhibitor for magnesium alloy surfaces.

Sodium molybdate formulations may be used to protect ferrous alloys from galvanic corrosion due to the close proximity in an adhesively bonded assembly of a more anodic/cathodic material. Also, phosphonic acid (e.g., trinitrilotrismethylene phosphonic acid) combined with fatty amines (such as N-oleyl-1,3-propane diamine) has been used as an inhibitor for steels.

In embodiments of the invention one or more such corrosion inhibitors or surface layer conversion compounds are brought to the adhesive bonding interface between the dissimilar material surfaces in microcapsules dispersed in the mobile adhesive. The corrosion resistant contents of the microcapsules are released after the adhesive is applied to one or both of the parts and compacted between the assembled facing parts. The release of the corrosion inhibitor may be sudden or gradual. The release may occur before or after the adhesive is cured.

Other embodiments and advantages of the invention will be apparent from more detailed descriptions of embodiments of the invention.

DESCRIPTION OF ILLUSTRATIVE EMBODIMENTS

Figure 1:
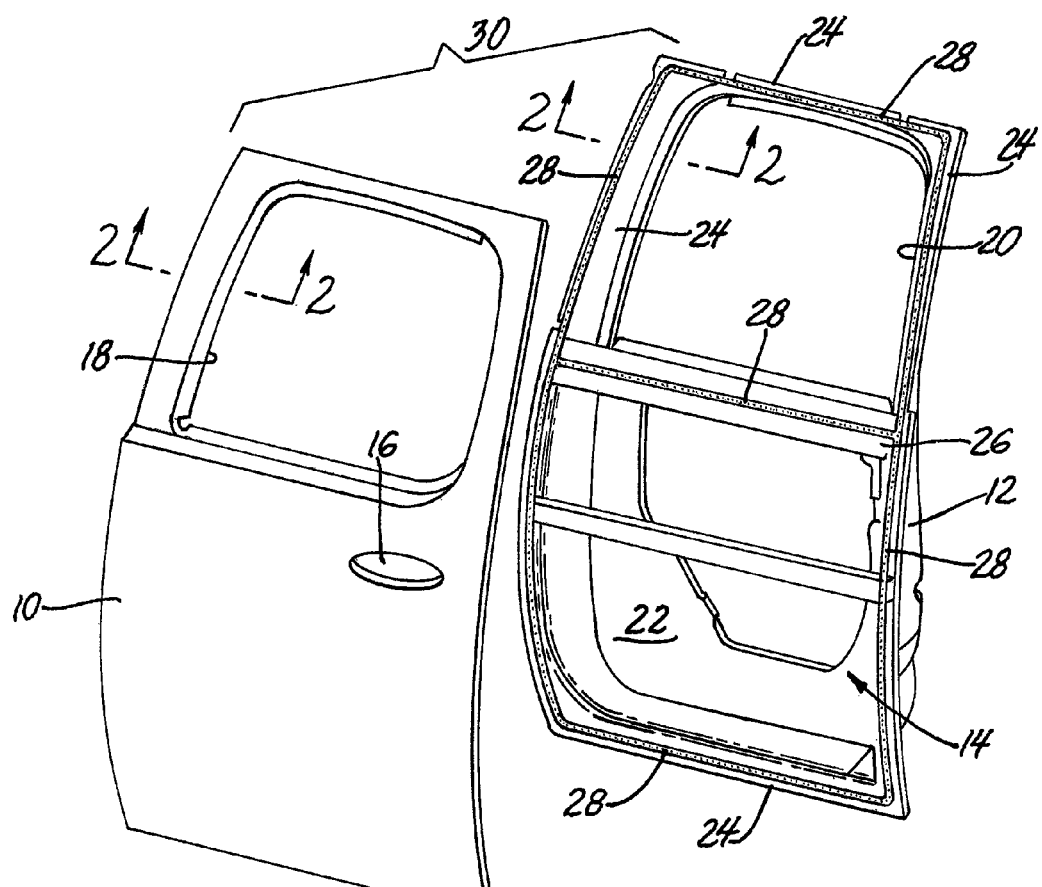
FIG. 1 illustrates representative shapes of inner and outer door panels of different metal alloy materials that are in a juxtaposed position for adhesive bonding.

In a representative embodiment, the invention may used in bonding inner and outer vehicle closure panels such as panels for doors, tailgates, deck lids, engine compartment hoods and the like. In order to reduce the weight of the closure part it may be desired to use, for example, a low carbon steel for the outer panel and a readily formable aluminum alloy for the inner panel. Other candidate combinations include steel/magnesium alloy panels, aluminum/carbon composite panels and aluminum/magnesium panels. Reference will be made to the drawing figures to illustrate an embodiment of the invention.

In FIG. 1, a low carbon steel outer panel 10 is seen positioned with its inner side (not visible in the figure) facing the inner side 14 of an aluminum alloy inner panel 12. Steel outer panel 10 has been stamped from blank sheet material to have the top to bottom curvature of the side of a vehicle, a formed region 16 for a handle for opening and closing the door, and a framed-in window opening 18. Inner panel 12 has been stamped from blank aluminum alloy sheet material to complement the shape of outer panel 10. Inner panel is shaped to define its corresponding window opening 20 and to provide a compartment (indicated generally at 22) for containing a mechanism for opening and closing a window and other components to be fitted within the bonded door panel assembly.

As best seen on the inner side 14 of inner panel 12 each stamping has peripheral surfaces 24 (on inner panel 12) and a belt line surface 26 for adhesive bonding to the facing side of the mating panel. In the structural adhesive bonding of these complementary inner and outer panels 10, 12 a strip or band of adhesive 28 is applied in a suitable pattern to surfaces 24 and 26 on inner surface 14 of inner panel 12. The outer panel 10 is than aligned against inner panel 12 in an assembly 30 with like peripheral and beltline surfaces of the inner side of the outer panel pressed against the applied adhesive.

Figure 2:
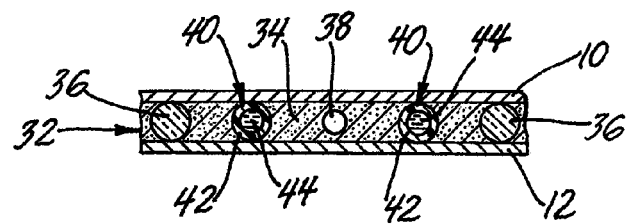
FIG. 2 is a portion of a cross-sectional view at 2-2 of the juxtaposed panels of FIG. 1 illustrating an adhesive layer with small spacer beads and microcapsules containing corrosion inhibiting material for bonding the panel members.

FIG. 2 is a portion of the cross-section taken at locations 2-2 of FIG. 1 showing the interface between facing panels 10, 12 with an interfacial layer of adhesive mixture 32. The thickness of the adhesive mixture of FIG. 2 is enlarged with respect to the thicknesses of the layers of the facing panels 10, 12 to better illustrate the microcapsules included in the adhesive mixture 32. By way of example, the thicknesses of panels 10, 12 is often in the range of about one to two millimeters and the thickness of the cured or hardened adhesive layer 32 is, nominally, less than one millimeter.

As illustrated in FIG. 2, adhesive mixture layer 32 is of generally uniform thickness. Layer 32 contains a polymerizable matrix 34 or vehicle of epoxy resin composition or other suitable thermosetting polymeric composition. Dispersed in the adhesive matrix 34 are spacer bodies 36 for maintaining a predetermined separation distance between facing sides of panels 10, 12 until the adhesive matrix composition 34 has been activated and hardened to form a strongly adherent interfacial bond. Spacer bodies 36 may be spherical glass beads which are chemically inert in the interfacial environment and are required only to prevent unhardened adhesive from being squeezed from between the surfaces to be joined. Only two spacer bodies 36 are illustrated in FIG. 2 but they would be used in a sufficient number per unit of area to serve their spacing function at the bonding surfaces of the facing parts.

A catalyst-containing microcapsule 38 is illustrated in the polymerizable matrix 34. Catalyst capsules 38 may be used in one-part adhesive formulations to prevent premature curing of the adhesive matrix 34. Once the adhesive mixture 32 has been applied to peripheral surfaces 24 and beltline surface 26 of panel surface(s) 12, 14 and the panels mated and supported for hardening of the adhesive, the catalyst capsules 38 may be activated by heating, exposure to ultrasonic energy, cracking of the microcapsules during dispensing, or other suitable means.

The polymerizable matrix 34 also contains corrosion inhibiter filled microcapsules 40. Microcapsules 40 comprise breakable or porous spherical walls 42 with a liquid or suitably mobile core 44 of corrosion inhibitor composition. Again, only two corrosion inhibitor microcapsules 40 are illustrated in FIG. 2 for simplicity of illustration. But they would be incorporated in the adhesive matrix 34 in suitable abundance and area density to provide corrosion protection to one or both of the adhesive bound surfaces of panels 10, 12. The volume fraction of all capsules and (spacer) beads in the adhesive phase is preferably kept below about forty percent, thereby ensuring good mechanical properties of the adhesive in addition to providing sufficient corrosion inhibition.

Thus, a feature of the invention is to mix a corrosion inhibitor or conversion coating material into the adhesive. The adhesive with dispersed microcapsules of inhibitor or conversion coating is "painted" or sprayed, or otherwise coated, on one of the substrates to be joined. In FIG. 2, corrosion inhibitor-containing microcapsules 40 are illustrated as unbroken, as they have been mixed with the adhesive matrix 34 in preparing the microcapsule-containing adhesive composition 32. However, in practices of the invention, corrosion inhibitor material is released from the capsules to flow to one or both surfaces of the facing panels. Two modes are envisioned for corrosion inhibitor release: immediate and slow-release.

In general, the immediate release would be as the adhesive is applied or the adhesive coated panel surfaces are pressed together. In this group of embodiments, the inhibitor microcapsules may be broken by action of the adhesive applicator device, by pressure of the assembled bonding surfaces, or by application of disruptive energy (e.g., heat or ultrasonic energy) during or shortly after adhesive application. For this mode of release the use of larger sized microcapsules (i.e., 200 to 500 micrometers in diameter) may be preferred, especially for breaking with sonic energy. When the core material of the corrosion inhibitor microcapsules comprised a polar protic solvent such as water or a glycol, it may be preferred to break the microcapsule when the adhesive is applied to facilitate displacement of the liquid from the broken capsules and adhesive onto metal surfaces to be protected. Many corrosion inhibitor materials have been employed in aqueous solutions. It may be preferred to formulate such materials in a glycol, or similar medium, and encapsulate the liquid core material in a shell composed of a polymer (such as polyurethane).

Thus, in the immediate release embodiment, microcapsules 40 are cracked or broken within the adhesive matrix 32 when panels 10, 12 are positioned and pressed together in the bonding operation. Corrosion inhibitor fluid leaks from the microcapsules 40 and flows into contact with the facing surfaces of panels 10, 12. The inhibitor material reacts with one or both of the material surfaces as specified to form a protective coating (not illustrated) on a surface to prevent galvanic corrosion in the adhesive bond area.

In a related embodiment the microcapsules are cracked or broken upon dispensing to mix the chemicals contained in the microcapsules. Because it is desired to maintain the adhesive layer thickness by the sphere size in many adhesive applications, it is proposed that some of the spheres (microcapsules) be thin walled or otherwise be designed to crack upon force applied to fixture the joint. Hence a bimodal distribution of spheres can be envisioned, with some spheres that crack and release chemical agents, while others maintain structural integrity under expected compressive forces.

As mentioned, a different way to crack or disrupt the microcapsules may be through the use of ultrasonic energy. Ultrasonic compression waves would be highly effective over the size range envisioned for microcapsules. Further, ultrasonic energy could be equally effective at disrupting microcapsules with either rigid or pliable walls. In some embodiments, the ultrasonic energy may be supplied through the metal after the parts are joined.

In another embodiment of the invention, heat may be used to cause the microcapsules to crack and/or increase the rate of chemical dispensing, or where heat can be used to instigate an exothermic reaction to cause any of the above described methods for release of the inhibitor material from the microcapsules, for example in an oven used to bake paint.

In another embodiment of the invention, some of the necessary corrosion-related chemicals would be prepared and contained in some microcapsules that do not crack when the adhesive joint is formed. Instead the size and material of these microcapsules would release the corrosion inhibiting chemicals slowly, possibly over the anticipated life of the part. This would allow for a continued replenishment of the conversion coating or inhibition throughout a long duration (perhaps 10 years if diffusion rates through the bead surface are correctly adjusted via porosity and thickness changes of the bead material). In this embodiment, the corrosion inhibiting material may be encapsulated in, for example, porous silica. Diffusion through the walls of the silica capsules and through the cured adhesive may be slow, but absorption and reaction of the inhibitor with the nascent corrosion product will continue to provide a concentration gradient for continued diffusion.

Corrosion Inhibiting Materials

Chromate conversion coatings are typically used to retard the corrosion of aluminum alloy workpiece surfaces or magnesium alloy surfaces. The surfaces are immersed in or brought into contact with in aqueous solutions containing, for example, 4 g/l of $CrO_3$, 3.5 g/l of $Na_2Cr_2O_7$, and 0.8 g/l NaF. Normally a 30 second immersion is used to treat the Al or Mg surface. Alodine®, a product of the Henkel Company is a suitable chromate conversion material for inclusion in suitable microcapsules.

Zinc sulfate is a common cathodic corrosion inhibitor for surfaces of aluminum and magnesium alloy surfaces. Phosphates, silicates, nitrates, fluorides, benzoates, and various soluble oils are also useful inhibitors. Where an aluminum alloy contains copper sodium mercaptobenzothiazole may be a useful inhibitor. Sodium carboxylate is often a suitable inhibitor for magnesium alloy surfaces. Aqueous-based hydrotalcite-based conversion coatings may also be used to promote the formation of protective alkali metal/aluminum hydroxide layers over aluminum surfaces and magnesium workpiece surfaces.

Sodium molybdate formulations may be used to protect ferrous alloys from galvanic corrosion due to the close proximity in an adhesively bonded assembly of a more anodic/cathodic material. Also, phosphonic acid (e.g., trinitrilotrismethylene phosphonic acid) combined with fatty amines (such as N-oleyl-1,3-propane diamine) has been used as an inhibitor for steels.

After the corrosion resistant material has been prepared in a suitably liquid or mobile form it is injected into previously prepared microcapsules of a compatible material. A vacuum-capable autoclave may be used to force fluids of conversion coating materials or inhibitors into commercially available microspheres or microcapsules at low temperature and under moderate pressure.

Practices of the invention have been described using illustrations that are not intended to limit the scope of the invention.

The invention claimed is:

1. A method of forming a corrosion resistant adhesive bond between facing panel surfaces of different compositions where the composition of at least one of the surfaces is susceptible to corrosion; the method comprising:
   applying a curable adhesive composition to a bonding region of at least one of the panel surfaces, the adhesive composition comprising microcapsules of a corrosion inhibiting composition for at least one of the surface compositions, the curable adhesive composition further comprising spacer beads for maintaining an interfacial gap between the facing surfaces until the adhesive is cured;
   placing the facing surfaces together to form an adhesive interface;
   promoting curing of the adhesive and at a predetermined time after the facing surfaces have been placed together
   promoting release of the corrosion inhibiting composition from microcapsules for corrosion inhibiting contact over the adhesive bonding region with at least one of the facing panel surfaces, the release of the corrosion inhibiting composition from at least some of the microcapsules being promoted before the adhesive is cured.

2. A method of forming a corrosion resistant adhesive bond as recited in claim 1 in which the panel surfaces are of different metal alloys.

3. A method of forming a corrosion resistant adhesive bond as recited in claim 2 in which the panel surface to be protected is an aluminum alloy surface and the corrosion inhibiting composition comprises a chromate composition.

4. A method of forming a corrosion resistant adhesive bond as recited in claim 2 in which the panel surface to be protected is a magnesium alloy surface and the corrosion inhibiting composition comprises a chromate composition.

5. A method of forming a corrosion resistant adhesive bond as recited in claim 2 in which the panel surface to be protected is a ferrous alloy surface and the corrosion inhibiting composition comprises a molybdate composition.

6. A method of forming a corrosion resistant adhesive bond as recited in claim 1 in which the curable adhesive composition also contains microcapsules of a catalyst for curing the adhesive and the catalyst-containing microcapsules are caused to release the catalyst to promote curing of the adhesive.

7. A method of forming a corrosion resistant adhesive bond as recited in claim 1 further comprising promoting release of the corrosion inhibiting composition from microcapsules for corrosion inhibiting contact with at least one of the surfaces by application of heat to crack the microcapsules.

8. A method of forming a corrosion resistant adhesive bond as recited in claim 1 further comprising promoting release of the corrosion inhibiting composition from microcapsules for corrosion inhibiting contact with at least one of the surfaces by application of ultrasonic energy to crack the microcapsules.

9. A method of forming a corrosion resistant adhesive bond as recited in claim 1 in which release of the corrosion inhibiting composition from some microcapsules continues after the curing of the adhesive.

10. A method of forming a corrosion resistant adhesive bond between facing panel surfaces of different compositions where the composition of one of the facing panel surfaces is a steel alloy and the composition of the other facing panel surface is an aluminum alloy or a magnesium alloy; the method comprising:
  applying a curable adhesive composition to a bonding region of at least one of the panel surfaces, the adhesive composition comprising microcapsules of a corrosion inhibiting composition for at least one of the surface compositions, the curable adhesive composition further comprising spacer beads for maintaining an interfacial gap between the facing panel surfaces until the adhesive is cured;
  placing the facing panel surfaces together to form an adhesive interface;
  promoting curing of the adhesive; and, before the adhesive is cured
  promoting release of the corrosion inhibiting composition from microcapsules for corrosion inhibiting contact over the adhesive bonding region with at least one of the facing panel surfaces.

* * * * *